United States Patent
Averbuch et al.

(10) Patent No.: US 12,072,904 B1
(45) Date of Patent: Aug. 27, 2024

(54) DATA TRANSFORMATION TOOLKIT

(71) Applicant: Microsoft Technology Licensing, LLC, Redmond, WA (US)

(72) Inventors: Yaakov Averbuch, Netanya (IL); Eran Shamir, Zichron (IL); Jacob Barac, Haifa (IL); Michael Urinovsky, Netanya (IL); Ido Barkan, Pardes Hanna-Karkur (IL); Itshak Shami, Tel Aviv (IL); Ilya Venger, Haifa (IL); Roni Yahav, Rehovot (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/325,464

(22) Filed: May 30, 2023

(51) Int. Cl.
*G06F 16/25* (2019.01)

(52) U.S. Cl.
CPC .................. *G06F 16/254* (2019.01)

(58) Field of Classification Search
CPC .................................................... G06F 16/254
See application file for complete search history.

(56) References Cited

U.S. PATENT DOCUMENTS

| | | | |
|---|---|---|---|
| 7,681,185 B2 | 3/2010 | Kapoor et al. | |
| 8,504,513 B2 | 8/2013 | Aski et al. | |
| 9,870,411 B2 | 1/2018 | Liu et al. | |
| 11,334,594 B2 | 5/2022 | Gibson | |
| 2021/0232591 A1* | 7/2021 | Portisch | G06F 16/24564 |
| 2022/0027380 A1* | 1/2022 | Martin | G06Q 40/08 |

OTHER PUBLICATIONS

"ACID Transactions", Retrieved from: https://www.databricks.com/glossary/acid-transactions#:~:text=in%2Dbetween%20state.-,A.C.I.D.%20properties,-%3A%20Atomicity%2C%20Consistency%2C%20Isolation, Retrieved Date: Sep. 8, 2022, 5 Pages.

"Data Movement Architecture", Retrieved from: https://help.sap.com/doc/c7bcc1546e1b1014b768ceab915404f5/16.6.10/en-US/data_movement_modeling.pdf, Dec. 17, 2019, 174 Pages.

"Hevo Documentation", Retrieved from: https://docs.hevodata.com/, Retrieved Date: Jan. 12, 2023, 2 Pages.

(Continued)

*Primary Examiner* — Etienne P Leroux
(74) *Attorney, Agent, or Firm* — Holzer Patel Drennan

(57) ABSTRACT

Transformation of source data from a source field of a source table to a target field of a target table using data transformation archetypes. A set of data transformation archetypes may be defined that each comprises transformation code for transforming the source data. A data transformation archetype may be identified by a data transformation toolkit engine for application to the source data based on the target field of the target table. In this way, a characteristic or relationship of the target field (e.g., as described by a target schema and/or target semantic) may be used to identify the data transformation archetype for use in transforming source data mapped to the target field. Accordingly, a more efficient and less error-prone Export, Transform, and Load (ETL) tool may be provided that provides automation of the transformation without requiring a user to dictate the transformation operations manually.

20 Claims, 6 Drawing Sheets

(56) References Cited

OTHER PUBLICATIONS

Naeem, Tehreem, "Introduction to Zero-Code ETL", Retrieved from: https://www.astera.com/type/blog/data-etl-pipelines/, Mar. 24, 2020, 6 Pages.

"Transformations and Mapping", Retrieved from: https://etlworks.com/transformations-and-mapping.html, Retrieved Date: Apr. 12, 2023, 7 Pages.

Rad, Reza, "Temporal Tables and Their Roles in ETL and Data Warehouse", Retrieved from: https://radacad.com/temporal-tables-and-their-roles-in-etl-and-data-warehouse, May 19, 2016, 20 Pages.

* cited by examiner

DATA TRANSFORMATION TOOLKIT

BACKGROUND

Data Export, Transform, and Load (ETL) tools may be used in a variety of data processing applications in which data is to be transformed from a source database to a target database. ETL tools have become more prevalent and accessible for use in data integration solutions. This has led to a rise in the popularity of "no-code" ETL tools that provide a graphical user interface for the setup and use of ETL processes without requiring extensive software development or coding skills. As such, these ETL tools are designed to be user-friendly and allow for utilization in more ETL contexts.

In addition, with the expansion of big data, ETL tools have evolved to attempt to address larger volumes of data from diverse sources. This has led to a rise in demand for data lakes and data warehouses that can store and manage large amounts of data. ETL tools have adapted to support these data architectures. However, as the size of the source data and target tables increases, so does the complexity involved in development and implementation of data transformation operations.

SUMMARY

In some aspects, the techniques described herein relate to a method of transforming source data from a source field of a source table to a target field of a target table, the method including: obtaining a mapping of the source field of the source table to the target field of the target table; identifying a data transformation archetype from a set of data transformation archetypes based on the target field of the target table; and executing transformation code corresponding to the data transformation archetype to transform the source data from the source field of the source table to the target field of the target table.

In some aspects, the techniques described herein relate to a computing system for transforming source data from a source field of a source table to a target field of a target table, the computing system including: one or more hardware processors; a data transformation toolkit engine executable by the one or more hardware processors and configured to obtain a mapping of source field of the source table to the target field of the target table; and a data transformation archetype identified by the data transformation toolkit engine from a set of data transformation archetypes based on the target field of the target table, the data transformation archetype including transformation code executable by the one or more hardware processors to transform the source data from the source field of the source table to the target field of the target table.

In some aspects, the techniques described herein relate to one or more tangible processor-readable storage media embodied with instructions for executing on one or more processors and circuits of a computing device a process for transforming source data from a source field of a source table to a target field of a target table, the process including: obtaining a mapping of the source field of the source table to the target field of the target table; identifying a data transformation archetype from a set of data transformation archetypes based on the target field of the target table; and executing transformation code corresponding to the data transformation archetype to transform the source data from the source field of the source table to the target field of the target table.

This summary is provided to introduce a selection of concepts in a simplified form. The concepts are further described below in the Detailed Description. This summary is not intended to identify key features or essential features of the claimed subject matter, nor is it intended to be used to limit the scope of the claimed subject matter.

Other implementations are also described and recited herein.

DETAILED DESCRIPTION

Figure 1:
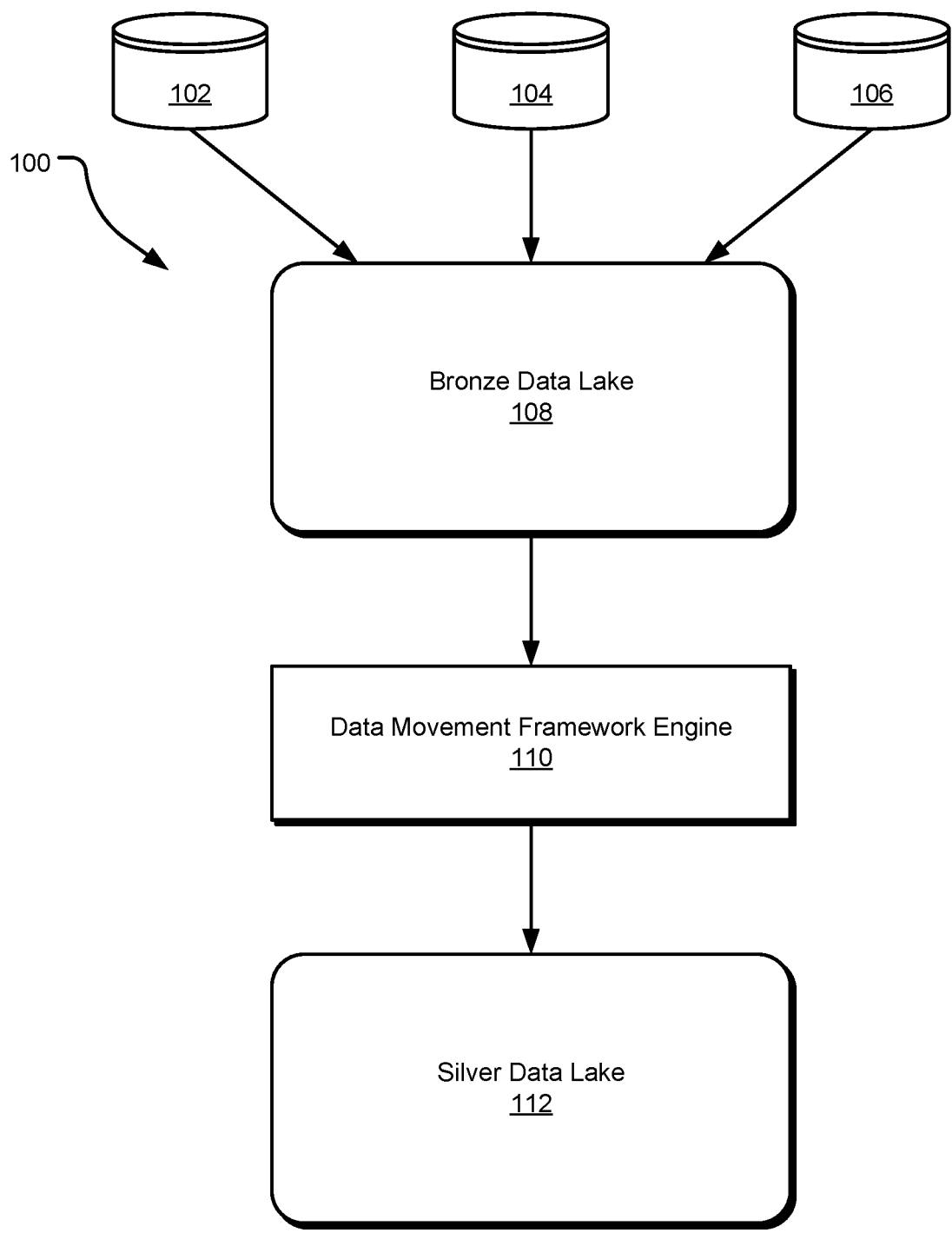
FIG. 1 illustrates an example data environment for transformation of data from a source data lake to a target data lake.

Large data environments may provide a comprehensive collection of datasets, metadata, and other related resources that provide a way of organizing and managing data in a coherent and consistent manner. Especially in view of the growing size of many data environments, data management within a data environment is crucial to provide a framework for organizing and utilizing data. Large data environments may provide a way of conceptualizing and organizing large and complex collections of data, with the goal of making the data contained in the data environment more accessible, discoverable, and usable for a wide range of applications in a variety of different data domains.

However, the process of data management in a large data environment may be complex. ETL tools have been developed to assist in data transformation operations for cleansing, organizing, normalizing, and/or otherwise transforming data within a large data environment. Despite the development of ETL tools, these tools remain complex, fragile, and subject to error, as noted above. For example, no-code ETL tools still require data engineer expertise to design reliable and efficient transformation of data. Particularly in the context of big data implementations, data transformation processes generated by ETL tools are long, complex, and error-prone. This is especially true in cases where an incremental update is required or when denormalized source data is to be transformed into a highly normalized target. In turn, while ETL tools have driven improved data integration, implementation of ETL tools continues to be difficult to implement and prone to error.

The described technology provides a data transformation toolkit facilitated by a data transformation toolkit engine that may facilitate an improved ETL tool to provide enhanced data transformation in a data environment. The data transformation toolkit contemplated herein utilizes data transformation archetypes that correspond to a target field of a target table into which data is to be transformed from a source table. As such, the data transformation toolkit described herein may provide an ETL tool that allows for relatively simple, robust mapping of source fields of source data to target fields. Based on this mapping, the nature of the target field (e.g., as defined by target semantics and/or a target schema) may allow for identification of a data transformation archetype from a set of data transformation archetypes that is applicable to the transformation of data from the source field to the target field. In turn, transformation code associated with the data transformation archetype may be executed to transform the source data to the target table based on the identified data transformation archetype. In this regard, a user may only provide a mapping from a source field to a target field, and the data transformation may be automated to provide reliable, scalable, and reduced error transformation of the data without requiring a data engineer or other highly skilled user to manually develop the transformation logic.

With reference to FIG. 1, a data environment 100 is illustrated in which data may be transformed from a source to a target. The data environment 100 may include a plurality of data sources illustrated as data source 102, data source 104, and data source 106. As may be appreciated, the data sources 102-106 illustrated in FIG. 1 are provided for illustrative purposes such that additional or fewer data sources may be provided without limitation.

Data from the data source 102, the data source 104, and the data source 106 may be collected into a bronze data lake 108. The bronze data lake 108 may be part of a medallion data lake architecture. Such a medallion data lake architecture may organize data into different tiers having different characteristics. The bronze data lake 108 may be the "landing zone," where data is initially ingested into the data environment 100 from the data sources 102-106. The data sources 102-106 may represent different sources of data within an organization or business. Additionally or alternatively, the data sources 102-106 may include sources of data from across a plurality of different organizations or businesses. As such, data in the bronze data lake 108 may be relatively disorganized (e.g., especially in relation to a silver data lake 112 or other higher order data lake in the data environment 100). For example, data in the bronze data lake 108 may include denormalized data extracts such as propriety and non-temporal data shapes. Moreover, data in the bronze data lake 108 may include duplicate data, inconsistent keys, or other disadvantageous anomalies that may limit the applicability or usefulness of data in the bronze data lake 108. Data contained in the bronze data lake 108 may also lack a comprehensive or unified semantic structure or schema structure or may lack any semantic structure or schema structure. Stated differently, the data in the bronze data lake 108 may represent raw data as is received from the data sources 102-106 in a relatively low-value format.

In contrast, a silver data lake 112 in the data environment 100 may be provided that contains cleansed and transformed data that may be used for a specific purpose, such as data analytics or the like. The data in the silver data lake 112 may take the form of published, normalized, and/or temporal data shapes that may also have a comprehensive and unified semantic structure and schema. While additional data lakes, such as gold data lakes, may be provided to contain further processed data for additional purposes (e.g., application of machine learning or artificial intelligence), the present disclosure focuses on data transformation operations for data from the bronze data lake 108 to the silver data lake 112.

However, it should be appreciated that the approaches described herein may generally be used for any data to transform the data from a data source (e.g., the bronze data lake 108) to a target (e.g., the silver data lake 112).

As shown in FIG. 1, in order to provide transformed (e.g., normalized, temporal data) data in the silver data lake 112, data from the bronze data lake 108 may be transformed by a data transformation toolkit engine 110. The approaches described in the present disclosure may utilize information regarding a target field of a target table in a target database (e.g., a target field in the silver data lake 112) to allow the data transformation toolkit engine 110 to identify a data transformation archetype for application of transformation code to the source data.

This approach may facilitate improvements to traditional ETL tools because a mapping of a source field of a source table to a target field of a target table may be all that is required to allow for identification of the data transformation archetype to be utilized and application of appropriate transformation code to the source data. This is in contrast to requiring an extensive manual definition of transformation operations for each specific mapping as is the case with traditional ETL tools. While prior approaches have been used for processing data between a bronze data lake 108 and a silver data lake 112, these prior approaches suffer from a number of disadvantages. Specifically, processing of data from a bronze data lake 108 to a silver data lake 112 has typically required the involvement of a data engineer familiar with the data environment 100 to manually develop data transformation operations for each source field to be mapped to a target, which may include definition of complex, interrelated operations with multiple steps and many dependencies. For example, such manual processing may require manually identifying related target tables (e.g., intermediate tables) that must be updated or modified in conjunction with the transformation of source data from the source field to the target field. As can be appreciated, this type of manual approach becomes burdensome when many source tables and source fields need to be transformed or when a target database includes many related target tables, as is common with highly normalized data. Even in no-code solutions that utilize a graphical user interface to develop and maintain the transform operations, the complexity of a resulting user interface becomes a hindrance. In addition, transformations of similar quality or characteristics that follow the same general approach may need to be defined repeatedly without efficient re-use of transformation coding, which further makes the transformations tedious and error-prone. Furthermore, when a project is provided as a solution to a customer, any modifications by a customer may make it difficult or impossible to provide updates to the project as there is no way to merge customer changes with development updates to the underlying transformation approach.

Accordingly, the use of a set of data transformation archetypes for transforming data from the bronze data lake 108 to the silver data lake 112 may provide a more efficient, more reliable, less error-prone approach to transforming data in the data environment 100. Each of the data transformation archetypes may include transformation code that may be executed to transform source data from a source table (e.g., in the bronze data lake 108) to a target table (e.g., in the silver data lake 112). The data transformation archetypes may be generally applicable to any source data such that the transformation code for each data transformation archetype is highly reusable for application to any source data regardless of the source of the data or the domain from which the data is generated. That is, as the data transformation archetypes may relate to general characteristics of a target field and/or target table, the data transformation toolkit engine 110 may be highly portable and scalable for use in a variety of data environments without regard to the specific data being transformed or a domain to which the data relates. For example, the data transformation toolkit engine 110 may be equally able to transform healthcare data as it is business data such that the data transformation toolkit engine 110 may be readily deployed across a variety of data environments 100 quickly and efficiently with users (or other means) only having to provide a mapping between a source field and a target field for the transformation to be realized.

The data transformation toolkit engine 110 may additionally provide other processing efficiencies related to the transformation of source data. For example, the data transformation toolkit engine 110 may facilitate incremental data by automatically detecting new data in a source (e.g., the bronze data lake 108). That is, as new data is added to the bronze data lake 108 from the data sources 102-106, the data transformation toolkit engine 110 may automatically detect such new data and transform such data to append the data as transformed data to a target (e.g., the silver data lake 112). As will be appreciated below, by mapping source fields of source tables to target fields of target tables, new data records provided for a given source field may be automatically detected and transformed by the data transformation toolkit engine 110.

In addition, the data transformation toolkit engine 110 may execute transformation code for a given data transformation archetype that may create intermediate records in intermediate target tables between a target root table and a mapped target table. That is, the data transformation toolkit engine 110 may automatically identify intermediate target tables other than a target table containing a target field of a mapping. The intermediate target tables may be automatically identified by the data transformation toolkit engine 110 executing transformation code for a given data transformation archetype based on the mapping to the target field. This may include identifying an anchor table in the target database and processing a database schema to determine any or all intermediate target tables in the target database that are to be appended with intermediate records related to the transformed source data. While examples are provided in greater detail below, adding such intermediate records to intermediate target tables may further utilize characteristics of the intermediate target table fields to identify further data transformation archetypes for use in appending intermediate data related to the source data when populating intermediate records for intermediate target tables. As will be described below, this approach may, among other examples, allow for non-temporal data to be transformed into temporal data in a normalized target database (e.g., a change in customer address may be used to update an address field in a target table and may also create a temporal record in a corresponding duration table to reflect the duration at which the client was at the previous address and the duration associated with the new address).

The data transformation toolkit engine 110 may also create integrations for source values into corresponding integration key values. For example, 'Software Engineer' job title may transform into a long integer value key value such as 13222. In another example, a 'CustomerID' value for a given customer entity may differ in different source values when used as either primary keys or foreign keys in the data sources. The data transformation toolkit engine 110 may maintain an integration key value that harmonizes the different "CustomerID" values for use during transformations performed by the data transformation toolkit engine 110 to allow for harmonization of the different source values. Such mapping may be provided by key integration between a source database and a target database. Accordingly, a source identifier from the bronze data lake 108 may be identified and mapped to an integration key in an integration key table. This may be used to map different source values to a common value for use in transforming source data from a plurality of discrete sources without uniform identifiers or other keys. That is, incorporating data coming from different data sources may utilize an integration key value for all source fields with the same semantic value, even if those different data sources use different keys to reference the same semantic value. The integration key (which may include a transformation of a source field value to a long integer value) may be used as a primary key/foreign key relation. As such, a match between an integration key field and an internal identifier field in a source table allows the data transformation toolkit engine 110 to perform a consistent replacement or transformation of data from different data sources 102-106.

In addition, the data transformation toolkit engine 110 may utilize reference data (e.g., from reference tables in the target database) to provide a check on new data in the source database. For example, if a source value does not exist in a target reference table, a default value can optionally be assigned. Other transformations performed by the data transformation toolkit engine 110 may include a transformation of string identifiers into long integer value identifiers (e.g., a globally unique identifier (GUID) into long integer variables). In addition, the data transformation toolkit engine 110 may transform composite keys from a source into long integer identifiers in the target. Furthermore, the data transformation toolkit engine 110 may support ACID transactions, allowing rollback in case of error or other issues.

Figure 2:
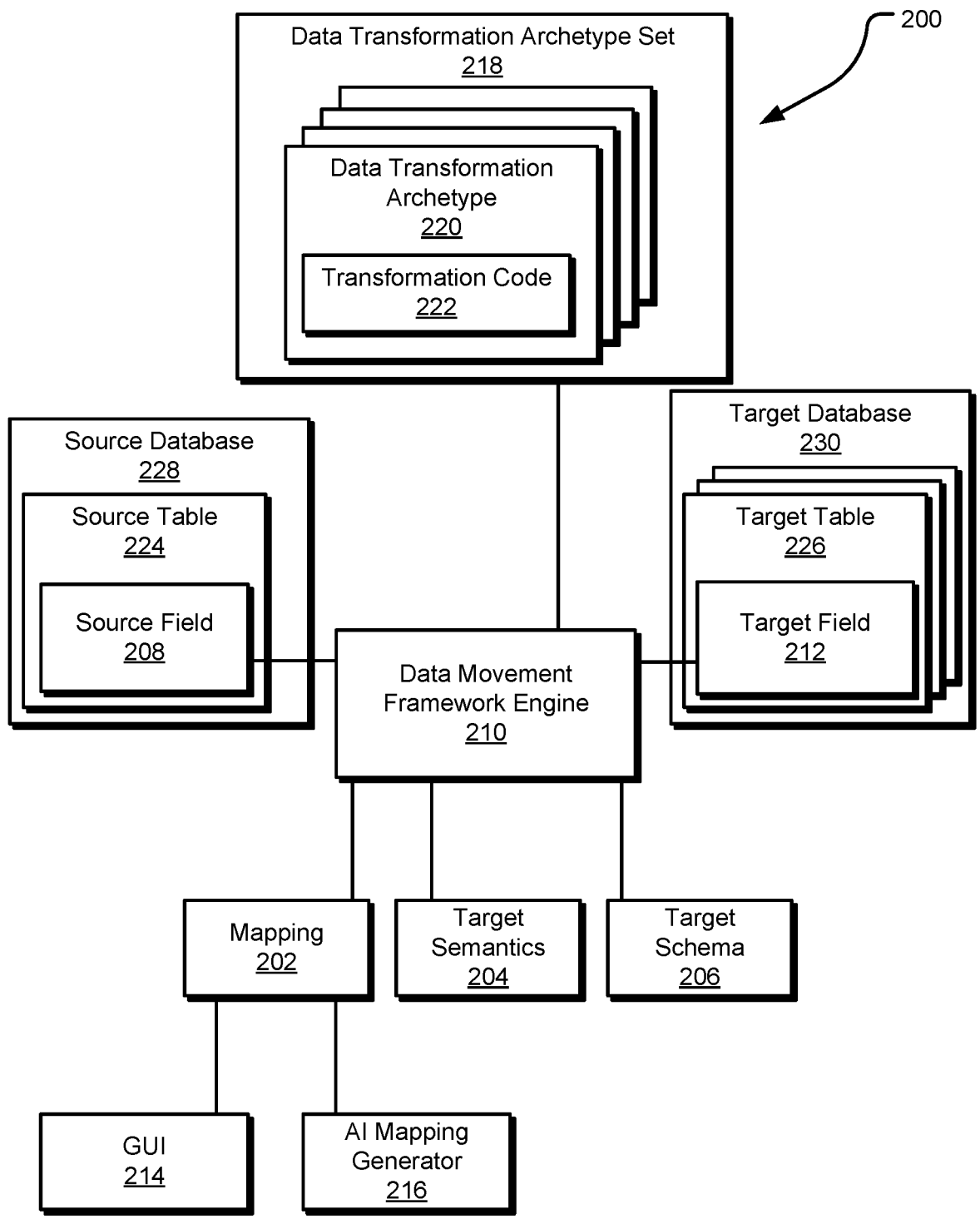
FIG. 2 illustrates another example of a data environment in which a data transformation toolkit may transform data from a source database to a target database using data transformation archetypes.

Further details of an example data transformation toolkit engine 210 are illustrated in the data environment 200 of FIG. 2. The data environment 200 includes a data transformation toolkit engine 210 that has access to a source database 228. The data transformation toolkit engine 210 also has access to a target database 230 in which transformed data from the source database 228 may be stored. The source database 228 generally includes a source table 224 containing source data in a source field 208 of the source table 224. In addition, the target database 230 may include a target table 226 having a target field 212. As shown, the target database 230 may contain a plurality of target tables 226. In this regard, the target database 230 may be a normalized database that may have a semantics and/or a schema structure defining the types and/or relationships of the plurality of target tables 226. In an example, the source database 228 may be a bronze data lake 108 and the target database 230 may be a silver data lake 112.

In addition to having access to the source database 228 and the target database 230, the data transformation toolkit engine 210 may access, obtain, or otherwise be provided with a mapping 202, target semantics 204, and a target schema 206. The data transformation toolkit engine 210 may also access, obtain, store, or otherwise be provided a set of data transformation archetypes 218, which are described in greater detail below.

The mapping 202 obtained by the data transformation toolkit engine 210 may map the source field 208 to the target field 212. The mapping 202 may be generated manually by a user or may be at least partially automated. In the example in which the mapping 202 is generated by a user, a graphical user interface 214 may be provided as a no-code environment in which the user may select the source field 208 (e.g., from all or a selected subset of source fields from the target semantics 204) and the target field 212 (e.g., from all or a selected subset of source fields from the target semantics 204) for the mapping. In other examples, the mapping of the source field 208 to the target field 212 may be at least partially automated, such as by an artificial intelligence mapping generator 216 that may analyze the source database 228 and/or target database 230 to create a mapping between the source field 208 and the target field 212.

In addition, the mapping 202 may include a plurality of mappings between different source fields 208 and corresponding target fields 212. In one example, the mapping 202 may be a mapping file that identifies the source field 208 and source table 224 and the mapping of the source field 208 to the target field 212. Any appropriate file format may be provided for the mapping 202, including, for example, an XML file, a JSON file, or other data interchange file without limitation. In this regard, the mapping 202 may identify the source field 208 containing source data that is to be transformed for storage in the target field 212. As an alternative to receipt of a mapping file containing the mapping 202 at the data transformation toolkit engine 210, the mapping 202 may be obtained by the data transformation toolkit engine 210 as another type of identifier that may identify the source database 228 by use of a universal resource identifier (URI) to the data source folder in the source database 228 (e.g., the bronze data lake 108). For example, a database name, a data lake, or a linked service may be identified in relation to the source database 228. In addition, the mapping 202 may identify the target database 230 by, for example, providing a URI, a database name, or an identification of a linked service.

As noted above, the target database 230 may have a semantic structure and a schema that provides information regarding the structure or architecture of the target database 230. In this regard, the semantic structure and/or schema of the target database may be predefined. As examples, domain or industry specific databases may be utilized as a target to which source data is mapped, where the schema and/or semantics of the target database are specific to a given industry or data domain.

In any regard, the semantic structure of the target database 230 may be described by the target semantics 204. The target semantics 204 may be provided as a target semantics file of any appropriate data interchange format, such as JSON or XML, as examples. In addition, the schema of the target database 230 may be described by the target schema 206. The target schema 206 may also comprise a target schema file of any appropriate data interchange format, such as JSON or XML, as examples. The target semantics 204 may define the type of target tables 226 contained in the target database 230. Different types of target tables 226 are described in greater detail below. The target schema 206 may provide information regarding the structure of the target database 230, such as the relationship between target tables 226 in the target database 230. While a target semantics file and a target schema file are discussed in this example, it may also be appreciated that the data transformation toolkit engine 210 may receive identifiers (e.g., URIs or other pointers) for retrieval of the semantic and schema information for the target database 230.

As may be appreciated, the target semantics 204 and target schema 206 may provide information regarding the database structure and type of target tables 226 of the target database 230. For example, in the case where the target database 230 is a silver data lake 112, the silver data lake 112 may have defined semantics reflected in the target semantics 204 and a defined schema reflected in the target schema 206 that are particularly adapted to the purpose of the silver data lake 112 (e.g., to perform data analytics or the like).

Additionally or alternatively, the silver data lake 112 may be described by way of defined target semantics 204 and target schema 206 related to a given data domain. For example, the target semantics 204 and the target schema 206 may relate to a customer relationship management (CRM) database, a healthcare information database, or other particular data domain database structures. As the target semantics 204 and target schema 206 may be provided to the data transformation toolkit engine 210 for operation between any source database 228 and target database 230, the data transformation toolkit engine 210 may be flexibly deployed in any appropriate data environment 200 by providing the corresponding target semantics 204 and target schema 206 of the target database 230 to which transformed data is to be appended. As will be further illustrated below, as the set of data transformation archetypes 218 is similarly data domain agnostic, the data transformation toolkit engine 210 may be readily deployed into any of a wide variety of data domains for the transformation of source data to a target. That is, providing the mapping 202, target semantics 204, and target schema 206 may be all that is required to deploy the data transformation toolkit engine 210 for data transformation in contrast to prior approaches in which all such data transformations are required to be manually developed for each new deployment. This may allow easy adaptability of the data transformation toolkit engine 210 in a given data domain or even for use across a plurality of data domains.

Continuing the discussion of the target semantics 204, the target semantics 204 may define the type of target table 226 in the target database 230. For example, a number of different table types may be utilized in the target database 230, including, but not limited to, a reference table, an anchor table, an extension table, a duration table, or a timestamp table. A reference table may include predefined values that may be provided as key value fields. For example, a "MaritalStatus" reference table may include key value fields of "single," "married," "divorced," and "widowed." Reference tables may be used to transform source data based on context accurately. For example, a "State" field in the source table may have a value "AL." If the "State" field from the source table is mapped to a target "State" field, the target "State" field may have a foreign key to a "State" target reference table where the value "AL" corresponds to and returns the value of "Alabama." In contrast, if a value "AL" from a source table was mapped to an "Element" field in a target table with a foreign key to an "Element" target reference table, "AL" may correspond to and return a value of "Aluminum" based on the "Element" target reference table.

An anchor table may be a non-temporal table whose primary key values are mapped from a source table. An extension table may subclass an anchor table to provide subsets of a given value from the anchor table. For example, a target table "IndividualCustomer" may subclass a target anchor table "Customer" such that "Customer" may include customer organization and "IndividualCustomer" may identify individuals belonging to a given customer organization. That is, "Customer" may contain common properties for customers while "IndividualCustomer" contains additional properties. Many target tables 226 in the target database 230 may have an N:1 relationship to anchor tables such that a plurality of reference tables may reference an anchor table (e.g., a target anchor table "Customer" may be extended by an "IndividualCustomer" extension table that includes a listing of individuals of a customer organization and another target table containing different additional properties for the "Customer" table). In other examples, an extension table may have a 1:1 relationship with an anchor table. The 1:1 relationship between an extension table and an anchor table may be derived from the fact that the referencing (e.g., extension) table has a field that is both a single primary key for the table and a foreign key to the anchor table. This relationship may be utilized by the data transformation toolkit engine 210 by creating an extension record in which the primary key field for the extension record may be placed as the value of the primary key of the anchor table's primary key.

A duration table may be a temporal table that includes a start time field and/or end time field for a given record in the duration table. For example, a duration table "MaritalStatus" may maintain the marital status of an individual customer and provide the status (e.g., "married") as well as start dates (if any) and end dates (if any) associated with the given status (e.g., IndividualCustomer: John Doe, MaritalStatus: Married, Start Date: 10/1/612, End Date: none). A timestamp table may be a temporal table with a time field. Examples of a timestamp table may be a transaction table that identifies transactions and the date/time at which the transaction occurred.

As can be appreciated from the foregoing, in addition to a given table type, there may be specific relationships between tables that are defined by the target semantics 204. As an example from above, as the "IndividualCustomer" table subclasses "Customer," these tables may be related to define that "IndividualCustomer" is an extension table that extends values in the table "Customer." As will be appreciated further below, the target semantics 204 and target schema 206 may thus allow for the generation of a graph representation of the target database that reflects both the category to which a given table belongs and also the relationship of a given target table to other target tables in the target database, such as that illustrated in FIG. 3. For instance, a mapped target field 212 may be determined to be related to a target anchor table in the target database 230. As such, the target table 226 for the target field 212 and any intermediate tables between the target field 212 and the target anchor table may be identified so that intermediate records may be generated, updated, or appended.

The data transformation toolkit engine 210 may also access, store, receive or otherwise obtain a set of data transformation archetypes 218. The set of data transformation archetypes 218 may include a plurality of different data transformation archetypes 220. Each data transformation archetype 220 may include transformation code 222 that defines data transformation operations to be performed for the data transformation archetype 220. In this regard, each of the plurality of data transformation archetypes 220 may relate to an archetype characterization that describes the applicability of the data transformation archetype 220. Specifically, the archetype characterization may relate to the nature of the target field 212 to which the source field 208 is mapped by the mapping 202 (e.g., the type of target table 226 to which the target field 212 belongs or the relationship of the target table 226 to which the target field 212 belongs relative to another target table 226). In turn, the data transformation toolkit engine 210 may identify a characteristic of the target field 212 to determine which archetype characterization applies to the target field 212.

Examples of the data transformation archetypes 220 may include:
The target field references a reference table (Type 1);
The target field is in an anchor table (Type 2);
The target field is in an extension table that references an anchor table (Type 3);
The target field is in a duration table that references both an anchor table and a reference/other tables (Type 4);
The target field is in a timestamp table that references an anchor table (Type 5); and
The target field is in an anchor table, referencing a non-reference table (Type 6).
The target field is in an anchor table, referencing a party table (Type 7).
The anchor table to which duration tables are related has a state field (Type 8). Other data transformation archetypes may be provided without limitation that include archetype characterizations that relate to the type and/or relationship of a target table to another target table. In turn, for each data transformation archetype 220, the transformation code 222 may define data transformation operations to be performed on the source data in an ETL operation to append source data from the source table 224 to the target table 226.

Figure 3:
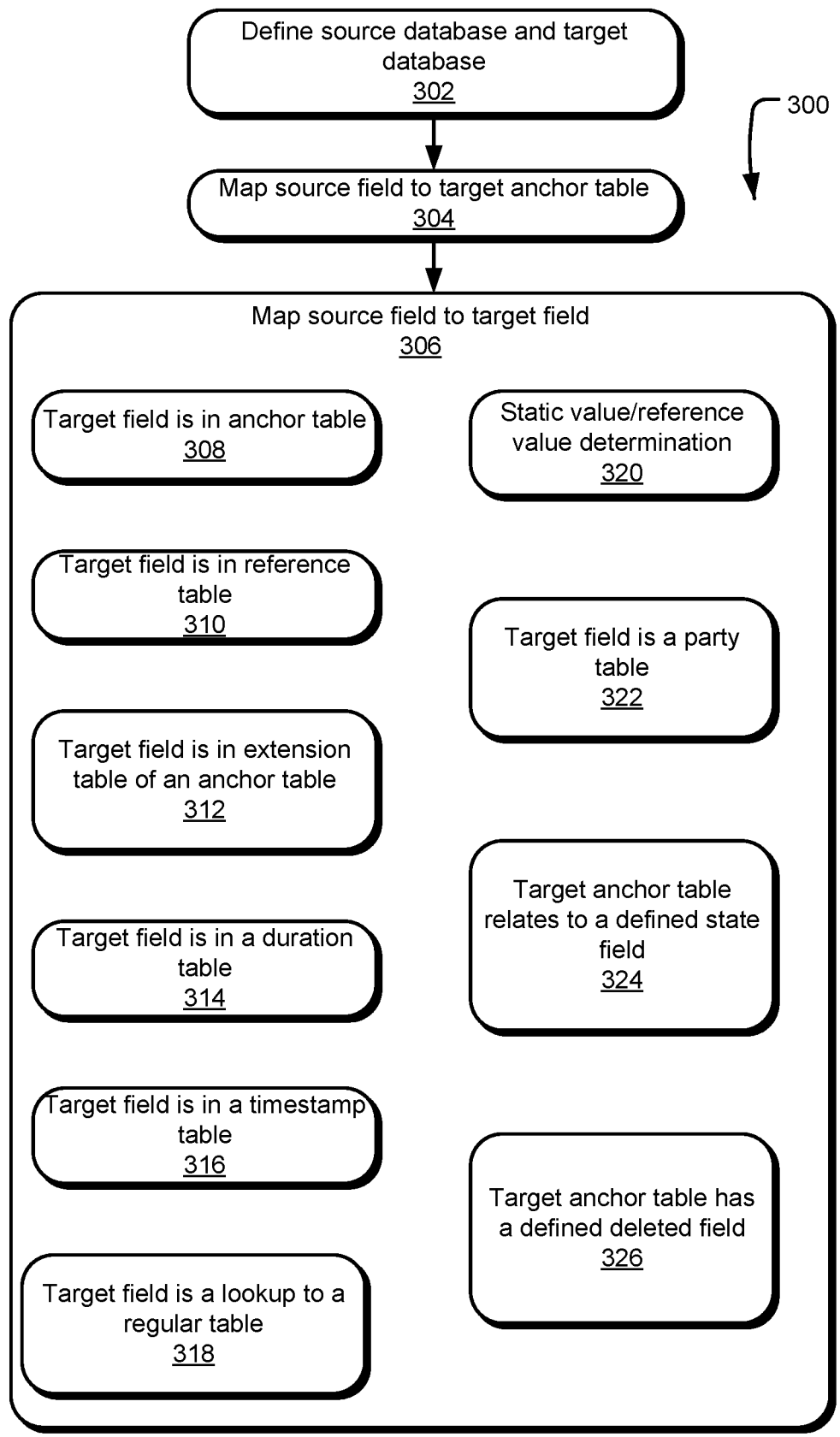
FIG. 3 illustrates example operations for generation of a mapping between a source field in a source database to a target field in a target database.

FIG. 3 illustrates example operations 300 for generating a mapping (e.g., mapping 202). The operations 300 may include a defining operation 302 in which the source database and the target database are defined. In addition, the operations 300 may also include a mapping operation 304 in which a source field from the source database is mapped to a target anchor table. For example, in this mapping operation 304, source fields from the source database referencing anchor tables may be mapped by a user such that the user is only offered target tables for selection that have a single primary key field. If the source table also has a related integration key field, the user may also map the source field to an integration key field in an integration table. This may allow for harmonization of different source field values into the mapping.

A further mapping operation 306 may include mapping the source field to a target field. In this operation, a user may create a new mapping for each source field to be mapped to the target database. In an example, a mapping user interface may be utilized to select a source field from the source database to map. Additionally, the user may also be presented with an option to create a calculated field using one or more source fields. In addition, the mapping operation 306 may allow for calculation operations to be defined relative to the source field, or other modifications may be manually defined by the user. The user may select a target field of a target table to which the source field is mapped. The target field to which the source field is mapped may be a single field, but in some cases, the mapping of a source field may be to multiple target fields (e.g., each of which may result in the application of a different transformation code based on different data transformation archetypes being identified for the different target fields).

As shown in FIG. 3, a plurality of different mapping types may be generated in the mapping operation 306, which generally relates to the data transformation archetypes noted above. For example, a first mapping option 308 may include mapping to a target field in an anchor table. In this case, the source field may have a data type of string, and the target field type may be a long integer such that a transformation between string and long integer is needed. In addition, if the target field is a lookup to a reference table, the data transformation toolkit may use the string from the source field to do a lookup to the reference table and return a reference key from the reference table, such as that described above in relation to a "State" or "Element" target reference table. In contrast, if the target field is a primary key or foreign key, the source field may be transformed to a long integer value using a relevant data mappings file.

A second mapping option 310 may include that the target field is a reference table. In this case, the data transformation toolkit may detect one or more intermediate tables between an anchor table and the target reference table and will update/create records as needed.

A third mapping option 312 may be one in which the target field is in an anchor extension table. In this case, the data transformation toolkit may detect that the field is an extension of the anchor table.

A fourth mapping option 314 may be one in which the target field is a duration table. In this case, if the source field value changes during incremental updates of the source data, a previous record in the duration table may be closed, and a new record in the duration table may be opened to create a history of the values for the source field. In this regard, a target field mapped to a duration table may close a prior record in the duration table, create a new record in the duration table, and may also update a current value for a table containing the current values in a non-temporal table. Moreover, the fourth mapping option 314 may include determining a uniqueness of the source data to the existing record, and if a uniqueness is identified, determining if the existing record corresponds to the new record. For example, the update may be related to a personal email rather than a work email such that a record in a personal email table (or a newly created record in a personal email table) may been to be opened. That is, the transformation may depend on uniqueness in an emailType field, such that the transformation may include parallel writes for the different respective email address types. This may further include updating of fields across multiple duration tables (e.g., a source may contain an update to both work and personal emails for an individual customer such that separate duration tables maintained for work email and personal email are each updated).

A fifth mapping option 316 may be one in which the target field is a timestamp table. In this example, the record from the source field may be added to the timestamp table along with a timestamp provided from the source field. The timestamp may be included in the source table of the source field, may be inferred from a modified date of the source table, may be inferred from the date of an incremental update of the source field, or inferred from some other timestamp value associated with the source field.

A sixth mapping option 318 is one in which the target field is a lookup to a regular table. In this example, the target field may be a foreign key to another table. As such, the source value may be mapped using a foreign key reference table mapping. The target field may reference a regular table, such as a non-reference or time-related table. Usually the source field type for the sixth mapping option 318 is a string variable such as a globally unique identifier. The target field may be a long anchor value. In such a case, an internal decoding process may occur in order to use the correct long integer value identifier.

A seventh mapping option 320 may be one in which additional fields in the target table have static values or an SQL expression. If the target field is a foreign key to a reference table, the user can select the reference table values when generating the mapping; otherwise, the user may provide a static value or and SQL expression.

An eighth mapping option 322 may be on in which the target field is in a 'party' table. A field in the source table (or a static value) may specify a party type. The party table may be referenced by multiple other target tables (which therefore act as extensions to the party table). Based on the party type, the data transformation toolkit may find a relevant target extension table to append/populate both the party table and the extension table with relevant transformed data from the source.

A ninth mapping option 324 is one in which a target anchor table to which one or more duration tables relate has a defined state field. A defined state field may have a plurality of discrete states (e.g., Active, InActive). In turn, when the state changes (e.g., between active and inactive) other related duration tables related to the anchor table (e.g., all related duration tables) may close a current duration record. That is, a change in state to "InActive" in a given state field may propagate through other tables, including related duration tables, causing the related tables to close an existing record. Similarly, when the state changes from to "Active," all duration records related to the anchor table may open a new duration starting from the records current data (e.g. modified date), leaving a time gap between the previous record and the new record.

A tenth mapping option 326 is one in which a target anchor table to which one or more duration tables relate has a defined deleted field. A defined deleted field may have two values (i.e., True, False). In turn, when the record is being deleted (e.g., between False and True) other related duration tables related to the anchor table (e.g., all related duration tables) may either close a current duration record, or actively delete the record. That is, a change in delete to "True" in a given deleted field may propagate through other tables, including related duration tables, causing the related tables to close/delete an existing record.

Figure 4:
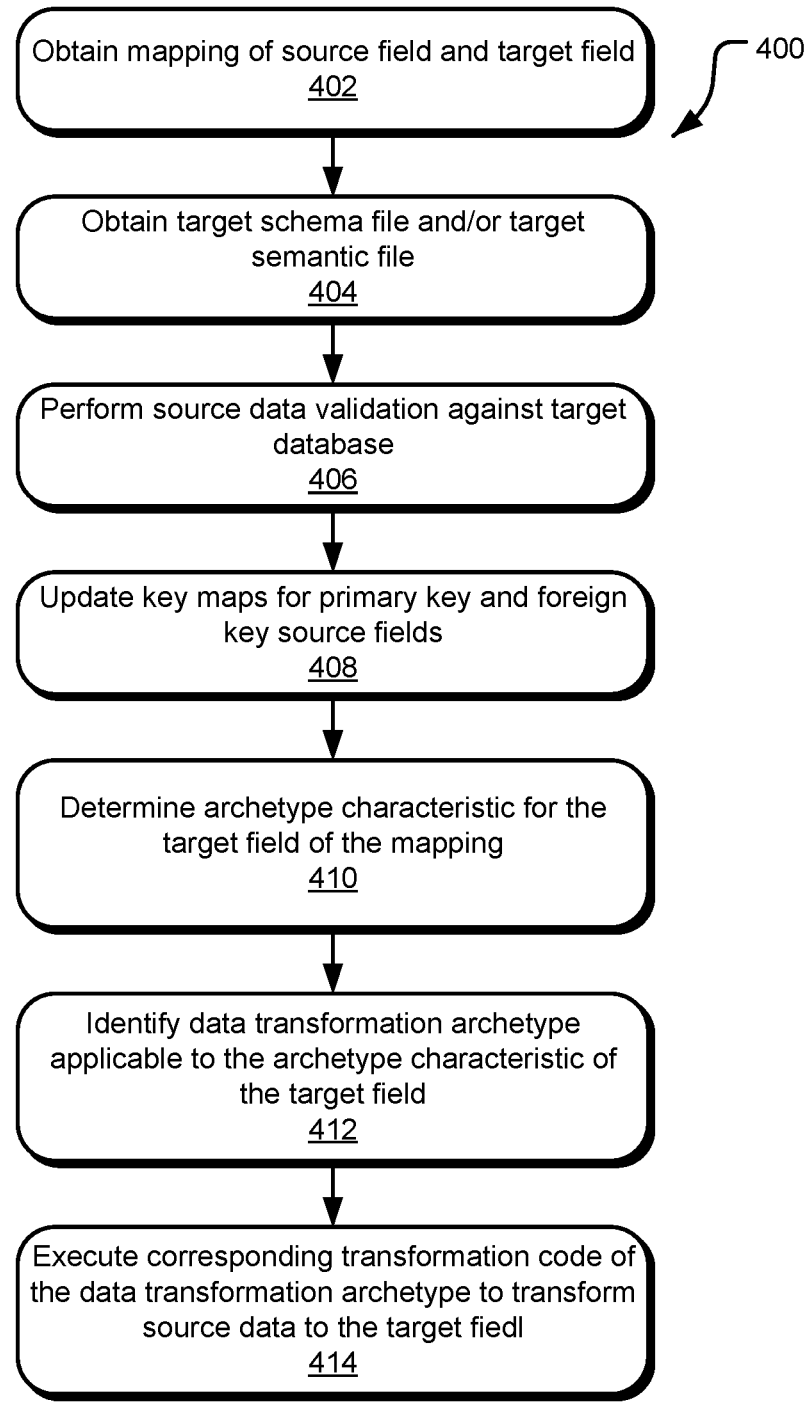
FIG. 4 illustrates example operations for executing a data transformation toolkit that utilizes a data transformation archetype for transformation of data from a source field to a target field.

FIG. 4 illustrates example operations 400 for the operation of a data transformation toolkit according to the present disclosure. The operations 400 may include an obtaining operation 402 in which a mapping of a source field to a target field is obtained by the data transformation toolkit. As noted above, the mapping may include a pointer (such as a URI) or may include a file that identifies the mapping between the source field and the target field. The example operations 400 may also include an operation 404 in which a target schema file and/or a target semantic file for the target table to which the target field belongs may be obtained. Again, the target schema file and/or the target somatic file may be provided directly or may include a reference or pointer to the schema and/or semantics information for a target table or target database.

A validation operation 406 may process source data to validate source data against the target database. For example, source fields may be checked for null values where such values are illegal, reference values may be checked to determine if the values exist in the target table, or other data validation operations may occur. In addition, a key update operation 408 may be performed. In many cases, a primary key or foreign key for the source table may not agree with those used by the target. For example, the source field value may be a string type, and the target field type may be a long integer value. As such, a mapping file may be updated to map between a string in the source field and a long integer value in the target field.

In addition, a determining operation 410 may be performed in which archetype characteristics of the target field of the mapping is determined. As described above, data transformation archetypes may be associated with archetype characteristics such as the nature of the target field and/or the relationship of the target table for the target field to other target tables in the target database. As such, once the nature of the target field is used to determine an archetype characteristic for the target field, an identifying operation 412 may be performed in which the corresponding data transformation archetype applicable to the archetype characteristic of the target field is identified from the set of data transformation archetypes. For example, as noted above, if the source field is mapped to a duration table, a "Type 4" data archetype, as described above, may be identified in the identifying operation 412. An executing operation 414 may include applying transformation code associated with the data transformation archetype to source data in the source field. For example, following the "Type 4" example above, the executing operation 414 may include closing a prior record in the duration table containing the target field and creating a new record with a changed value for the target field.

Figure 5:
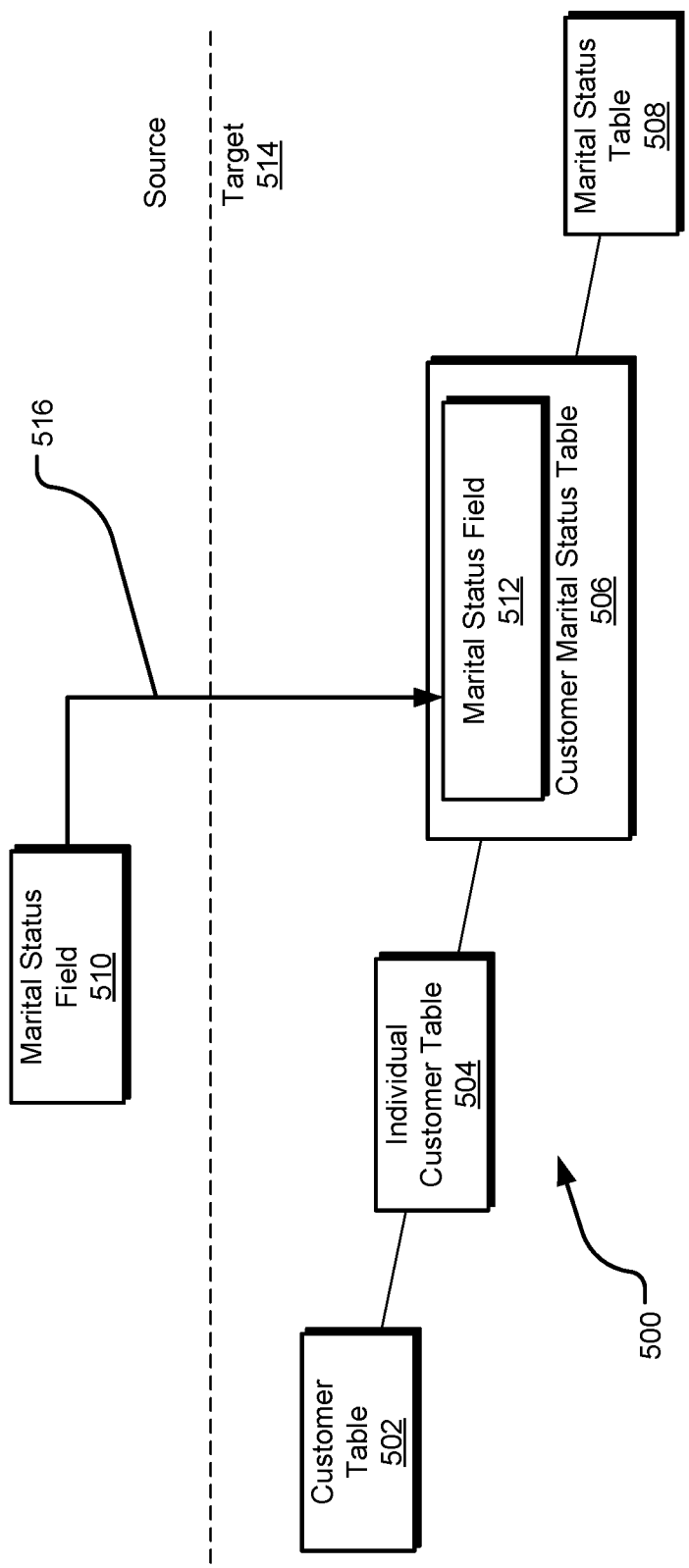
FIG. 5 illustrates an example target database table structure into which source data may be transformed using data transformation archetypes.

With further reference to FIG. 5, one example of a data transformation from a source field of a source table to a target field of a target table is illustrated. For example, the source field may correspond to a marital status field 510. The marital status field 510 may be from a data source and describe a given individual customer of a customer organization.

The target database may have a schema and semantic structure that defines the table graph 500 shown in FIG. 5. For example, pseudo-code examples of a semantics file may include:
{
referencetables:
{
table: "MaritalStatus"
keyField: "MaritalStatusID"
nameField: "MaritalStatusName"
}
durationtables:
{
table: "CustomerMaritalStatus"
startField: "PeriodStartDate"
endField: "PeriodEndDate"
}

These portions of the semantics file may indicate that the Marital Status Table 508 is a reference table with a given key field and name field and that the Customer Marital Status Table 506 is a duration table with a Customer Marital Status field and start date and end dates. In addition, pseudo-code examples of a schema file may include:
{
name: "prCustomerId"
tables: "Customer"
"IndividualCustomer"
}

This portion of the schema file may indicate that the Individual Customer Table 504 subclasses the Customer Table 502. Accordingly, the Individual Customer Table 504 may be defined as an extension table of the Customer Table 502. In addition, as the Customer Marital Status Table 506 is defined as a duration table and the Marital Status Table 508 is defined as a reference table, the table graph 500 may be defined such that the Customer Table 502 is an anchor table, with Individual Customer Table 504, Customer Marital Status Table 506, and Marital Status Table 508 depending from the Customer Table 502 to provide a normalized data structure.

As such, a mapping 516 mapping the marital status field 510 to a marital status field 512 in the Customer Marital Status Table 506 may, based on the table graph 500 as determined from the semantics and schema file, allow the marital status field 512 to be a source field in a duration table that references a reference table. In this regard, the nature of the table graph 500 and mapping 516 allows for a Type 4 data transformation archetype described above to be identified as applying to the transformation of source data from the marital status field 510 to the marital status field 512. As such, the transformation code for the Type 4 data transformation archetype may be executed to transform source data from the marital status field 510 to the marital status field 512.

Specifically, the transformation code may execute such that an incremental data value from the marital status field 510 may be compared to the current value of the marital status field 512 (or to a collection of aliases of marital status values to derive the current marital status value) in the Customer Marital Status Table 506 to determine if a status has been changed. If the status has not been changed, no action may be taken. However, if the status has been changed, a prior record in the marital status field 512 may be closed in the Customer Marital Status Table 506, appending an end date to the prior record. As noted, the end date may be taken from a defined field in the source table for the marital status field 510 or may be generated based on an inferred date such as a date inferred from the modified date of the source table, a date the source table was analyzed, or a current date. In addition, a new record for the marital status field 512 in the Customer Marital Status Table 506 may be generated with a start date that is either provided in the source table or generated based on an inferred date, as noted above.

Moreover, as the Individual Customer Table 504 exists between the Customer Marital Status Table 506 containing the marital status field 512, the mapping 516 of the marital status field 510 to the marital status field 512 may also result in the Individual Customer Table 504 being identified as an intermediate table between the Customer Marital Status Table 506 and the anchor table of the Customer Table 502. In this regard, the transformation code may also define that a record corresponding to the marital status field 510 is updated in the Individual Customer Table 504 to reflect a current marital status of the individual to which the marital status field 510 applies. Such a change to an intermediate table could itself be associated with an intermediate data transformation archetype such that the appending of data to the Individual Customer Table 504 may be controlled by the transformation code associated with the intermediate data transformation archetype for a source field in the Individual Customer Table 504. This intermediate data transformation archetype may be different from the data transformation archetype for the marital status field 512. In this regard, nested transformation code execution may be facilitated by application to intermediate tables in the target database 514.

Figure 6:
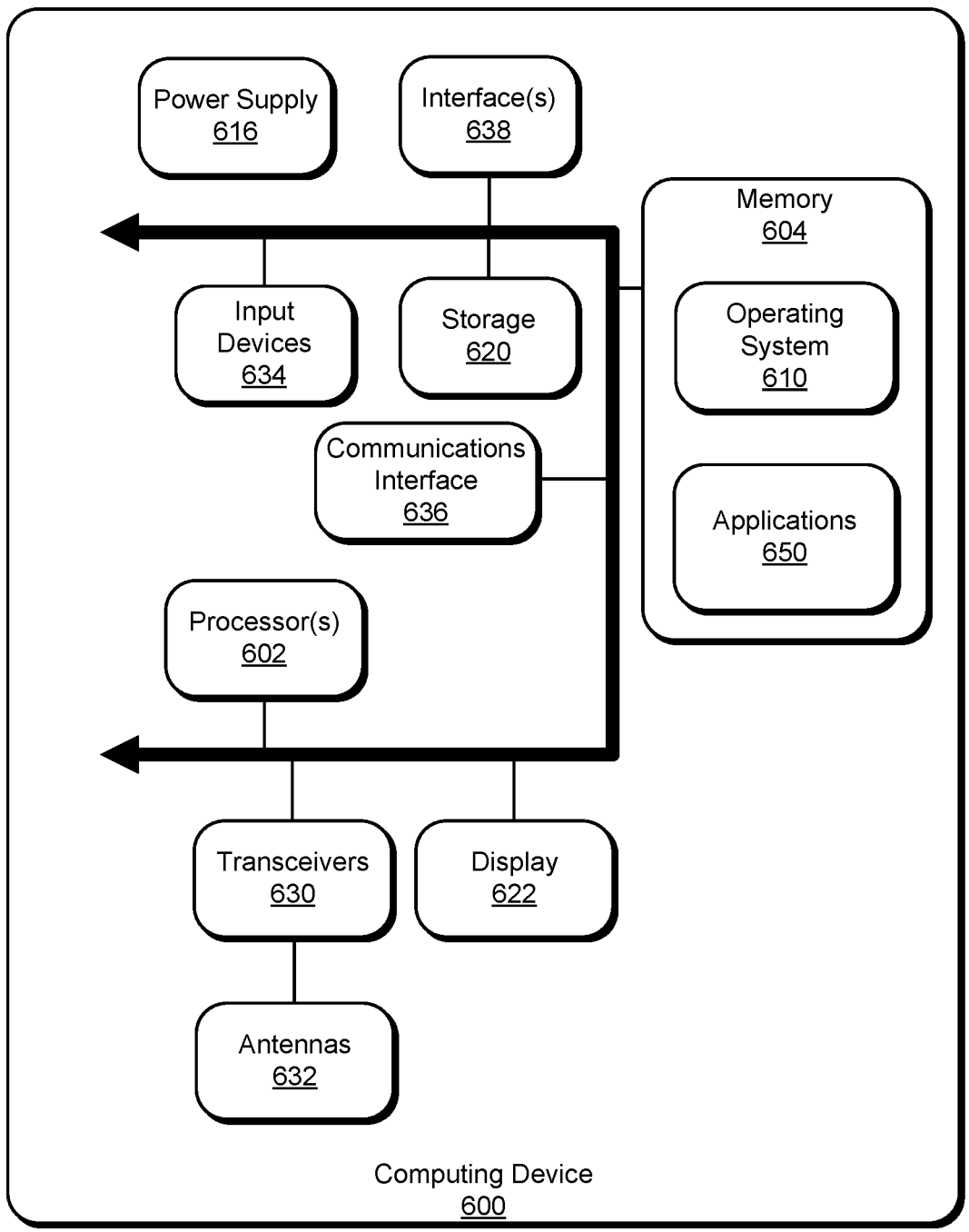
FIG. 6 illustrates an example computing device capable of execution of aspects of the present disclosure.

FIG. 6 illustrates an example computing device 600 for use in implementing the described technology. The computing device 600 may be a client computing device (such as a laptop computer, a desktop computer, or a tablet computer), a server/cloud computing device, an Internet-of-Things (IoT), any other type of computing device, or a combination of these options. The computing device 600 includes one or more processor(s) 602 and a memory 604. The memory 604 generally includes both volatile memory (e.g., RAM) and nonvolatile memory (e.g., flash memory), although one or the other type of memory may be omitted. An operating system 610 resides in the memory 604 and is executed by the processor(s) 602. In some implementations, the computing device 600 includes and/or is communicatively coupled to storage 620.

In the example computing device 600, as shown in FIG. 6, one or more modules or segments, such as applications 650, a data transformation toolkit engine, and other program code and modules are loaded into the operating system 610 on the memory 604 and/or the storage 620 and executed by the processor(s) 602. The storage 620 may store the source database, target database, the set of data transformation archetypes (including the corresponding transformation code associated with each respective one of the set of data transformation archetypes, and other data and be local to the computing device 600 or may be remote and communicatively connected to the computing device 600. In particular, in one implementation, components of a system including a data transformation toolkit engine and a data transformation archetype identified by the data transformation toolkit engine for execution of transformation code for transforming source data to a target field of a target table may be implemented entirely in hardware or in a combination of hardware circuitry and software.

The computing device 600 includes a power supply 616, which may include or be connected to one or more batteries or other power sources, and which provides power to other components of the computing device 600. The power supply 616 may also be connected to an external power source that overrides or recharges the built-in batteries or other power sources.

The computing device 600 may include one or more communication transceivers 630, which may be connected to one or more antenna(s) 632 to provide network connectivity (e.g., mobile phone network, Wi-Fi®, Bluetooth®) to one or more other servers, client devices, IoT devices, and other computing and communications devices. The computing device 600 may further include a communications interface 636 (such as a network adapter or an I/O port, which are types of communication devices). The computing device 600 may use the adapter and any other types of communication devices for establishing connections over a wide-area network (WAN) or local-area network (LAN). It should be appreciated that the network connections shown are exemplary and that other communications devices and means for establishing a communications link between the computing device 600 and other devices may be used.

The computing device 600 may include one or more input devices 634 such that a user may enter commands and information (e.g., a keyboard, trackpad, or mouse). These and other input devices may be coupled to the server by one or more interfaces 638, such as a serial port interface, parallel port, or universal serial bus (USB). The computing device 600 may further include a display 622, such as a touchscreen display.

The computing device 600 may include a variety of tangible processor-readable storage media and intangible processor-readable communication signals. Tangible processor-readable storage can be embodied by any available media that can be accessed by the computing device 600 and can include both volatile and nonvolatile storage media and removable and non-removable storage media. Tangible processor-readable storage media excludes intangible communications signals (such as signals per se) and includes volatile and nonvolatile, removable and non-removable storage media implemented in any method or technology for storage of information such as processor-readable instructions, data structures, program modules, or other data. Tangible processor-readable storage media includes but is not limited to RAM, ROM, EEPROM, flash memory or other memory technology, CDROM, digital versatile disks (DVD) or other optical disk storage, magnetic cassettes, magnetic tape, magnetic disk storage, or other magnetic storage devices, or any other tangible medium which can be used to store the desired information and which can be accessed by the computing device 600. In contrast to tangible processor-readable storage media, intangible processor-readable communication signals may embody processor-readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

In some aspects, the techniques described herein relate to a method of transforming source data from a source field of a source table to a target field of a target table, the method including: obtaining a mapping of the source field of the source table to the target field of the target table; identifying a data transformation archetype from a set of data transformation archetypes based at least in part on the target field of the target table; and executing transformation code corresponding to the data transformation archetype to transform the source data from the source field of the source table to the target field of the target table.

In some aspects, the techniques described herein relate to a method, wherein identifying the data transformation archetype is based at least in part on a schema of the target table.

In some aspects, the techniques described herein relate to a method, wherein identifying the data transformation archetype is based at least in part on a semantic of the target table.

In some aspects, the techniques described herein relate to a method, wherein executing the transformation code corresponding to the data transformation archetype includes: generating an intermediate target record in an intermediate target field of an intermediate target table, and wherein the method further includes: identifying an intermediate data transformation archetype from the set of data transformation archetypes based at least in part on the intermediate target field; and executing intermediate transformation code corresponding to the intermediate data transformation archetype to append target data to the intermediate target record in the intermediate target field of the intermediate target table.

In some aspects, the techniques described herein relate to a method, wherein the source table is a non-temporal table and the target table is a duration table that references a target anchor table and another target table, and wherein executing the transformation code further includes: determining a target record in the target anchor table corresponding to the source data; identifying an existing record associated with the target record in the duration table; determining the existing record has an existing value different from a source field value of the source data; modifying the existing record in the duration table to have an end date; and creating a new record in the duration table that sets a start date for the source field value of the source data associated with the source data to the new record.

In some aspects, the techniques described herein relate to a method, further including: performing a transformation for a source field value to a target field value that is selected from a target reference table.

In some aspects, the techniques described herein relate to a method, wherein executing the transformation code further includes: identifying an integration key from an integration table for which the source data has a primary key; wherein the integration key is as associated with at least one of a target primary key value or a target foreign key value in the target table.

In some aspects, the techniques described herein relate to a computing system for transforming source data from a source field of a source table to a target field of a target table, the computing system including: one or more hardware processors; a data transformation toolkit engine executable by the one or more hardware processors and configured to obtain a mapping of source field of the source table to the target field of the target table; and a data transformation archetype identified by the data transformation toolkit engine from a set of data transformation archetypes based at least in part on the target field of the target table, the data transformation archetype including transformation code executable by the one or more hardware processors to transform the source data from the source field of the source table to the target field of the target table.

In some aspects, the techniques described herein relate to a computing system, wherein the data transformation toolkit engine identifies the data transformation archetype at least in part based at least in part on a schema of the target table.

In some aspects, the techniques described herein relate to a computing system, wherein the data transformation toolkit engine identifies the data transformation archetype at least in part based at least in part on a semantic of the target table.

In some aspects, the techniques described herein relate to a computing system, wherein the data transformation toolkit engine executed by the one or more hardware processors is configured to generate an intermediate target record in an intermediate target field of an intermediate target table and identify an intermediate data transformation archetype from the set of data transformation archetypes based at least in part on the intermediate target field, and the one or more hardware processors is configured to execute intermediate transformation code corresponding to the intermediate data transformation archetype to append target data to the intermediate target record in the intermediate target field of the intermediate target table.

In some aspects, the techniques described herein relate to a computing system, wherein the source table is a non-temporal table and the target table is a duration table that references a target anchor table and another target table, and wherein the one or more hardware processors is configured by the transformation code to: determine a target record in the target anchor table corresponding to the source data; identify an existing record associated with the target record in the duration table; determine the existing record has an existing value different from a source field value of the source data; modify the existing record in the duration table to have an end date; and create a new record in the duration table that sets a start date for the source field value of the source data associated with the source data to the new record.

In some aspects, the techniques described herein relate to a computing system, wherein the one or more hardware processors is configured by the transformation code to identify an integration key from an integration table for which the source data has a primary key, and wherein the integration key is as associated with at least one of a target primary key value or a target foreign key value in the target table.

In some aspects, the techniques described herein relate to one or more tangible processor-readable storage media embodied with instructions for executing on one or more processors and circuits of a computing device a process for transforming source data from a source field of a source table to a target field of a target table, the process including: obtaining a mapping of the source field of the source table to the target field of the target table; identifying a data transformation archetype from a set of data transformation archetypes based at least in part on the target field of the target table; and executing transformation code corresponding to the data transformation archetype to transform the source data from the source field of the source table to the target field of the target table.

In some aspects, the techniques described herein relate to one or more tangible processor-readable storage media, wherein identifying the data transformation archetype is based at least in part on a schema of the target table.

In some aspects, the techniques described herein relate to one or more tangible processor-readable storage media, wherein identifying the data transformation archetype is based at least in part on a semantic of the target table.

In some aspects, the techniques described herein relate to one or more tangible processor-readable storage media, wherein executing the transformation code corresponding to the data transformation archetype includes generating an intermediate target record in an intermediate target field of an intermediate target table, and wherein the process further includes: identifying an intermediate data transformation archetype from the set of data transformation archetypes based at least in part on the intermediate target field; and executing intermediate transformation code corresponding to the intermediate data transformation archetype to append target data to the intermediate target record in the intermediate target field of the intermediate target table.

In some aspects, the techniques described herein relate to one or more tangible processor-readable storage media, wherein the source table is a non-temporal table and the target table is a duration table that references a target anchor table and another target table, and wherein executing the transformation code further includes: determining a target record in the target anchor table corresponding to the source data; identifying an existing record associated with the target record in the duration table; determining the existing record has an existing value different from a source field value of the source data; modifying the existing record in the duration table to have an end date; and creating a new record in the duration table that sets a start date for the source field value of the source data associated with the source data to the new record.

In some aspects, the techniques described herein relate to one or more tangible processor-readable storage media, wherein the process further includes: performing a transformation for a source field value to a target field value that is selected from a target reference table.

In some aspects, the techniques described herein relate to one or more tangible processor-readable storage media, wherein executing the transformation code further includes: identifying an integration key from an integration table for which the source data has a primary key, wherein the integration key is as associated with at least one of a target primary key value or a target foreign key value in the target table.

In some aspects, the techniques described herein relate to a system for transforming source data from a source field of a source table to a target field of a target table, the method including: means for obtaining a mapping of the source field of the source table to the target field of the target table; means for identifying a data transformation archetype from a set of data transformation archetypes based at least in part on the target field of the target table; and means for executing transformation code corresponding to the data transformation archetype to transform the source data from the source field of the source table to the target field of the target table.

In some aspects, the techniques described herein relate to a system, wherein the means for identifying the data transformation archetype is based at least in part on a schema of the target table.

In some aspects, the techniques described herein relate to a system, wherein the means for identifying the data transformation archetype is based at least in part on a semantic of the target table.

In some aspects, the techniques described herein relate to a system, wherein means for executing the transformation code corresponding to the data transformation archetype includes: means for generating an intermediate target record in an intermediate target field of an intermediate target table, and wherein the system further includes: means for identifying an intermediate data transformation archetype from the set of data transformation archetypes based at least in part on the intermediate target field; and means for executing intermediate transformation code corresponding to the intermediate data transformation archetype to append target data to the intermediate target record in the intermediate target field of the intermediate target table.

In some aspects, the techniques described herein relate to a system, wherein the source table is a non-temporal table and the target table is a duration table that references a target anchor table and another target table, and wherein the means for executing the transformation code further includes: means for determining a target record in the target anchor table corresponding to the source data; means for identifying an existing record associated with the target record in the duration table; means for determining the existing record has an existing value different from a source field value of the source data; means for modifying the existing record in the duration table to have an end date; and means for creating a new record in the duration table that sets a start date for the source field value of the source data associated with the source data to the new record.

In some aspects, the techniques described herein relate to a system, further including: means for performing a transformation for a source field value to a target field value that is selected from a target reference table.

In some aspects, the techniques described herein relate to a system, wherein the means for executing the transformation code further includes: means for identifying an integration key from an integration table for which the source data has a primary key; wherein the integration key is as associated with at least one of a target primary key value or a target foreign key value in the target table.

Some implementations may comprise an article of manufacture, which excludes software per se. An article of manufacture may comprise a tangible storage medium to store logic and/or data. Examples of a storage medium may include one or more types of computer-readable storage media capable of storing electronic data, including volatile memory or nonvolatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described embodiments. The executable computer program instructions may include any suitable types of code, such as source code, compiled code, interpreted code, executable code, static code, dynamic code, and the like. The executable computer program instructions may be implemented according to a predefined computer language, manner, or syntax, for instructing a computer to perform a certain operation segment. The instructions may be implemented using any suitable high-level, low-level, object-oriented, visual, compiled, and/or interpreted programming language.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order unless explicitly claimed otherwise or a specific order is inherently necessitated by the claim language.

What is claimed is:

1. A method of transforming source data from a source field of a source table to a target field of a target table, the method comprising:

obtaining a mapping of the source field of the source table to the target field of the target table;

identifying a data transformation archetype from a set of data transformation archetypes based at least in part on the target field of the target table; and executing transformation code corresponding to the data transformation archetype to transform the source data from the source field of the source table to the target field of the target table.

2. The method of claim 1, wherein identifying the data transformation archetype is based at least in part on a schema of the target table.

3. The method of claim 1, wherein identifying the data transformation archetype is based at least in part on a semantic of the target table.

4. The method of claim 1, wherein executing the transformation code corresponding to the data transformation archetype comprises:

generating an intermediate target record in an intermediate target field of an intermediate target table, and wherein the method further comprises:

identifying an intermediate data transformation archetype from the set of data transformation archetypes based at least in part on the intermediate target field; and executing intermediate transformation code corresponding to the intermediate data transformation archetype to append target data to the intermediate target record in the intermediate target field of the intermediate target table.

5. The method of claim 1, wherein the source table is a non-temporal table and the target table is a duration table that references a target anchor table and another target table, and wherein executing the transformation code further comprises:
  determining a target record in the target anchor table corresponding to the source data;
  identifying an existing record associated with the target record in the duration table;
  determining the existing record has an existing value different from a source field value of the source data;
  modifying the existing record in the duration table to have an end date; and
  creating a new record in the duration table that sets a start date for the source field value of the source data associated with the source data to the new record.

6. The method of claim 1, further comprising:
  performing a transformation for a source field value to a target field value that is selected from a target reference table.

7. The method of claim 1, wherein executing the transformation code further comprises:
  identifying an integration key from an integration table for which the source data has a primary key;
  wherein the integration key is as associated with at least one of a target primary key value or a target foreign key value in the target table.

8. A computing system for transforming source data from a source field of a source table to a target field of a target table, the computing system comprising:
  one or more hardware processors;
  a data transformation toolkit engine executable by the one or more hardware processors and configured to obtain a mapping of source field of the source table to the target field of the target table; and
  a data transformation archetype identified by the data transformation toolkit engine from a set of data transformation archetypes based at least in part on the target field of the target table, the data transformation archetype comprising transformation code executable by the one or more hardware processors to transform the source data from the source field of the source table to the target field of the target table.

9. The computing system of claim 8, wherein the data transformation toolkit engine identifies the data transformation archetype at least in part based at least in part on a schema of the target table.

10. The computing system of claim 8, wherein the data transformation toolkit engine identifies the data transformation archetype at least in part based at least in part on a semantic of the target table.

11. The computing system of claim 8, wherein the data transformation toolkit engine executed by the one or more hardware processors is configured to generate an intermediate target record in an intermediate target field of an intermediate target table and identify an intermediate data transformation archetype from the set of data transformation archetypes based at least in part on the intermediate target field, and the one or more hardware processors is configured to execute intermediate transformation code corresponding to the intermediate data transformation archetype to append target data to the intermediate target record in the intermediate target field of the intermediate target table.

12. The computing system of claim 8, wherein the source table is a non-temporal table and the target table is a duration table that references a target anchor table and another target table, and wherein the one or more hardware processors is configured by the transformation code to:
  determine a target record in the target anchor table corresponding to the source data;
  identify an existing record associated with the target record in the duration table;
  determine the existing record has an existing value different from a source field value of the source data;
  modify the existing record in the duration table to have an end date; and
  create a new record in the duration table that sets a start date for the source field value of the source data associated with the source data to the new record.

13. The computing system of claim 8, wherein the one or more hardware processors is configured by the transformation code to identify an integration key from an integration table for which the source data has a primary key, and wherein the integration key is as associated with at least one of a target primary key value or a target foreign key value in the target table.

14. One or more tangible processor-readable storage media embodied with instructions for executing on one or more processors and circuits of a computing device a process for transforming source data from a source field of a source table to a target field of a target table, the process comprising:
  obtaining a mapping of the source field of the source table to the target field of the target table;
  identifying a data transformation archetype from a set of data transformation archetypes based at least in part on the target field of the target table; and
  executing transformation code corresponding to the data transformation archetype to transform the source data from the source field of the source table to the target field of the target table.

15. The one or more tangible processor-readable storage media of claim 14, wherein identifying the data transformation archetype is based at least in part on a schema of the target table.

16. The one or more tangible processor-readable storage media of claim 14, wherein identifying the data transformation archetype is based at least in part on a semantic of the target table.

17. The one or more tangible processor-readable storage media of claim 14, wherein executing the transformation code corresponding to the data transformation archetype comprises generating an intermediate target record in an intermediate target field of an intermediate target table, and wherein the process further comprises:
  identifying an intermediate data transformation archetype from the set of data transformation archetypes based at least in part on the intermediate target field; and
  executing intermediate transformation code corresponding to the intermediate data transformation archetype to append target data to the intermediate target record in the intermediate target field of the intermediate target table.

18. The one or more tangible processor-readable storage media of claim 14, wherein the source table is a non-temporal table and the target table is a duration table that references a target anchor table and another target table, and wherein executing the transformation code further comprises:
  determining a target record in the target anchor table corresponding to the source data;
  identifying an existing record associated with the target record in the duration table;
  determining the existing record has an existing value different from a source field value of the source data;
  modifying the existing record in the duration table to have an end date; and
  creating a new record in the duration table that sets a start date for the source field value of the source data associated with the source data to the new record.

19. The one or more tangible processor-readable storage media of claim 14, wherein the process further comprises:
  performing a transformation for a source field value to a target field value that is selected from a target reference table.

20. The one or more tangible processor-readable storage media of claim 14, wherein executing the transformation code further comprises:
  identifying an integration key from an integration table for which the source data has a primary key, wherein the integration key is as associated with at least one of a target primary key value or a target foreign key value in the target table.

* * * * *